July 13, 1965  P. E. HUMPHREY  3,194,079
GIMBAL-LESS RATE GYRO
Filed May 27, 1963  2 Sheets-Sheet 1

INVENTOR.
PAUL E. HUMPHREY
BY Knox & Knox

July 13, 1965  P. E. HUMPHREY  3,194,079
GIMBAL-LESS RATE GYRO

Filed May 27, 1963  2 Sheets-Sheet 2

INVENTOR.
PAUL E. HUMPHREY
BY
Knox & Knox

# United States Patent Office 3,194,079
Patented July 13, 1965

3,194,079
GIMBAL-LESS RATE GYRO
Paul E. Humphrey, 7665 Central, Lemon Grove, Calif.
Filed May 27, 1963, Ser. No. 283,382
2 Claims. (Cl. 74—5.6)

The present invention relates to gyroscopes and more specifically to a gimbal-less rate gyro.

The primary object of this invention is to provide a rate gyro having a directly driven rotor mounted on a self-aligning bearing without the use of gimbals, yet which is capable of sensing and indicating rate of change of direction in a particular plane.

Another object of this invention is to provide a rate gyro in which the single rotor bearing is large and sturdy, with considerable resistance to shock and vibration.

Another object of this invention is to provide a rate gyro which is extremely simple in construction, with a minimum of moving parts, and is completely self-contained.

A further object of this invention is to provide a rate gyro which is adaptable to a variety of pick-off and indicating means, without modifying the basic mechanism.

With these objects in view, this invention consists in the novel construction and arrangement of elements, as hereinafter described in the specification, pointed out in the claims and illustrated in the drawings, which form a material part of the disclosure and in which:

Similar characters of reference indicate similar or identical elements and portions throughout the specification and throughout the views of the drawing.

Construction

Figure 1:
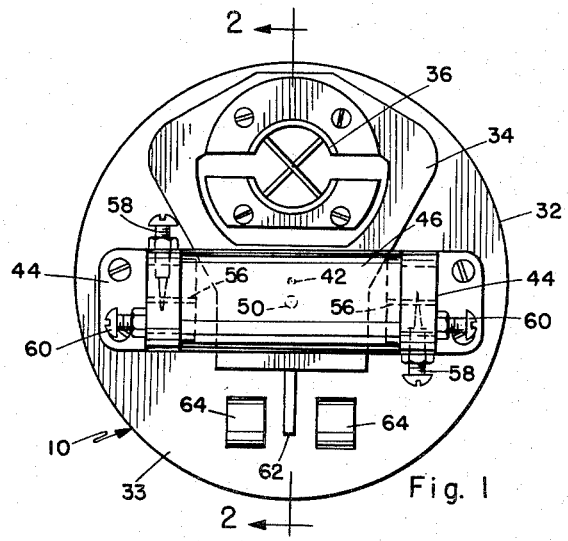
FIGURE 1 is an end elevation view of the gyro unit.
Figure 2:
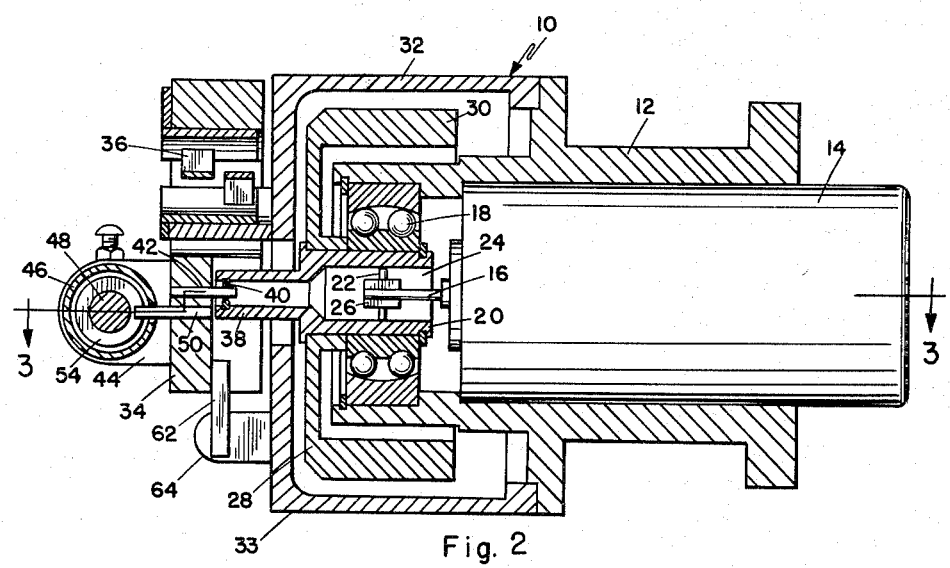
FIGURE 2 is a sectional view taken on line 2—2 of FIGURE 1.
Figure 3:
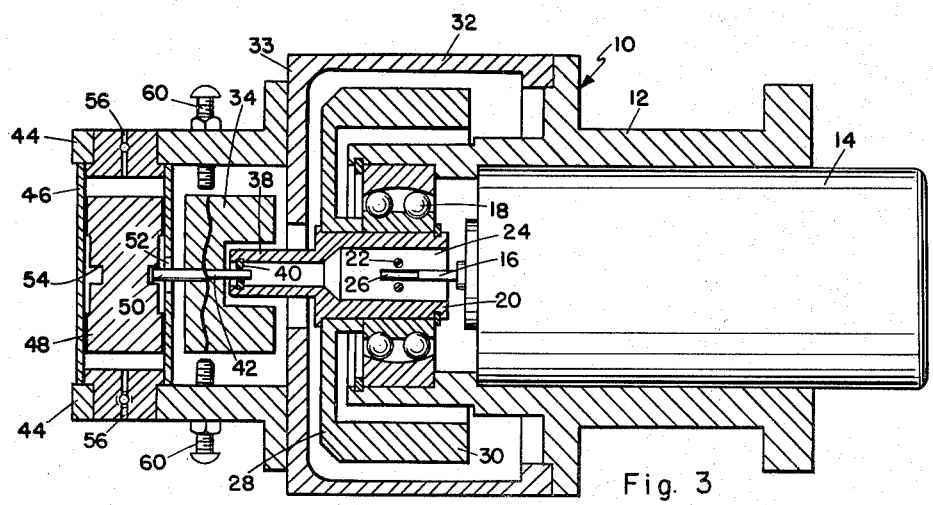
FIGURE 3 is a sectional view taken on line 3—3 of FIGURE 2.

The gyro unit, generally indicated at 10, comprises a frame 12 in which is mounted a motor 14 having a drive shaft 16, said motor being of any suitable type depending on the power source available in a specific installation. In the frame 12 is a self-aligning bearing 18 coaxial with drive shaft 16 and mounted in the bearing is a cylindrical hub 20 coupled to the drive shaft by a flexible coupling. Various types of couplings may be used, that illustrated comprising spaced parallel pins 22 extending across the hollow interior 24 of hub 20 and drive shaft 16 having a flat blade 26 which fits between said pins and imparts rotation thereto, while allowing deviation of the hub axis from the drive shaft axis. Fixed to hub 20 is a gyro rotor 28 having a thick annular rim 30 constituting the gyroscopic mass, the rim extending back over frame 12 to make the center of mass of the rotor substantially coincident with the pivotal center of bearing 18, which is capable of limited displacement universally about its normal axis during rotation, so avoiding balance problems.

Rotor 28 is enclosed in a casing 32 fixed to frame 12 and on the outer end face 33 of the casing is a pick-off arm 34 mounted on a low friction, self-centering pivot 36, the pivotal axis of which is parallel to but spaced from the axis of drive shaft 16. The pivot 36, as illustrated, is a cross-spring flexure pivot of the type shown in my U.S. Patent No. 2,931,092, but other low friction pivots with self-centering action may be utilized. Hub 20 has an axially extended hollow sleeve 38 containing an internal bearing ring 40 of hard, wear resistant material, such as a jewel. Fixed in the pick-off arm 34 is a pick-off pin 42 which fits through bearing ring 40 and is coaxial with sleeve 39 when the mechanism is in neutral position. As the rotor 28 turns, bearing ring 40 rotates around pick-off pin 42, said bearing ring being internally radiused or curved in cross section to allow limited universal motion around the pin. This provides a freely movable but positive connection between the rotor and pick-off arm.

Secured to the casing end face 33 are spaced brackets 44 between which is supported a cylinder 46 containing a slidable damper piston 48, movable substantially perpendicular to the axis of drive shaft 16. Fixed in pick-off arm 34 and spaced from pick-off pin 42 is a damping pin 50 which extends through a longitudinal slot 52 in cylinder 46 and engages a groove 54 in the piston 48. At each end of cylinder 46 is an air bleed port 56 controlled by a metering screw 58 to adjust the damping effect. Adjustable stops 60 are fitted through the brackets 44 to limit the swing of pick-off arm 34.

Various means can be used to measure the swing of pick-off arm 34, such as the pick-off element 62 depending from said arm between a pair of sensing elements 64 mounted on casing 32. The sensing elements 64 can be of inductive or magnetic type, capacitive elements, photoelectric, or a potentiometer or direct electrical contact means may be coupled to the pick-off arm. Such devices and their associated read-out or indicator means are well known and the type used will depend on the specific gyro installation. As one example, a needle could be coupled directly to the pick-off arm for use in a turn and bank instrument.

Operation

The gyro unit is essentially a single degree of freedom instrument to detect rate of change of direction generally in a plane perpendicular to the drive axis and parallel to the axis of the damping piston, since the motion of the pick-off arm is limited by the particular mounting arrangement. In actual practice the change of direction need not be exactly in that particular plane, the principle of this general type of rate gyro being well known.

Figure 4:
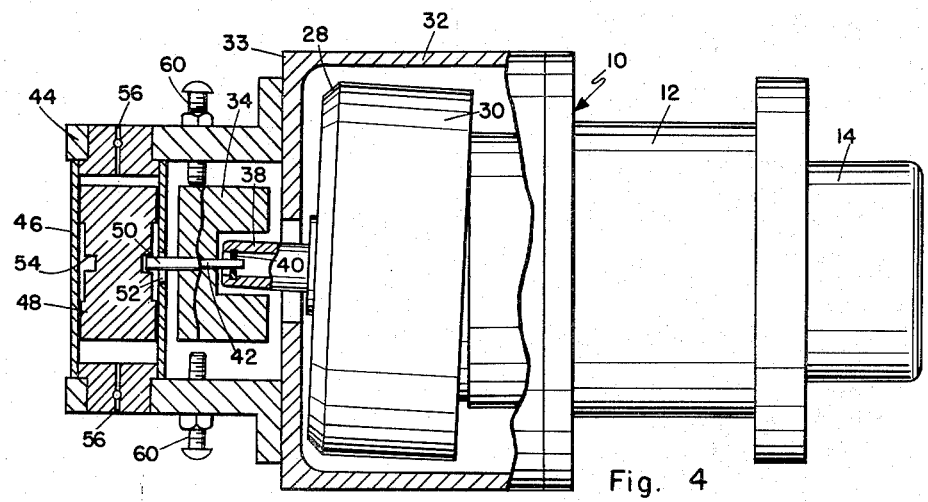
FIGURE 4 is a partially sectioned view similar to FIGURE 3, with the gyro rotor offset.
Figure 5:
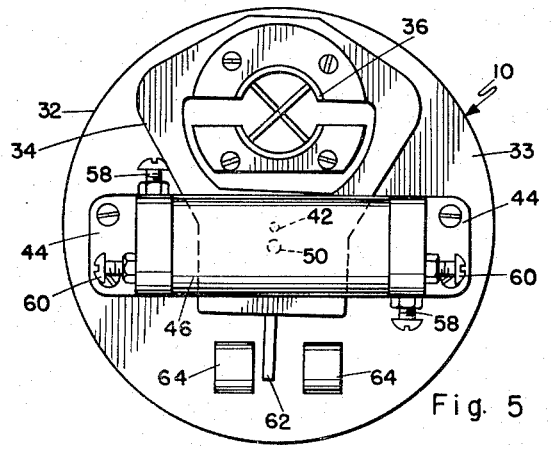
FIGURE 5 is an end elevation view of the unit with the mechanism in the position of FIGURE 4.

Normally the unit is installed in an aircraft or other vehicle with frame 12 fixed to surrounding structure. With the rotor 28 being driven, any change of direction in the sensitive plane of the gyro unit will cause the frame 12 to turn while the rotor 28 tends to remain fixed in space. The resultant precession torque of the rotor 28 imparted to pick-off pin 42 will swing the pick-off arm 34, as indicated in relative positions FIGURES 4 and 5. The motion is damped by piston 48 to prevent impact at full travel and to damp oscillations. Deflection of pick-off arm 34 is thus proportional to rate of change of direction and is measured by the sensing elements 64 to be utilized in a suitable manner. The actual deflection of the rotor axis can be very small, on the order of two or three degrees either side of a neutral position, and is easily accommodated in the mechanism illustrated without excess working clearance which might lead to inaccuracy. The self-centering action of the pick-off arm pivot 36 will return the rotor 28 to neutral spin axis position in the new direction as the rate of change of direction decreases to zero.

Since no gimbal is used, the rotor being supported on a single self-aligning bearing, there is no appreciable mass carried on the pick-off means. Thus by referring to the drive axis or neutral spin axis of the rotor as the input axis and the pivotal axis of the pick-off arm as the output axis, it will be evident that the ratio of the effective inertia about the input axis to the inertia about the output axis is very high. This arrangement provides high sensitivity and ensures smooth reliable action with good frequency response characteristics, or the ability to follow rapidly varying directional changes with accuracy. The single rotor bearing can be large and sturdy relative to the overall size of the unit, resulting in improved resistance to shock and vibration. With the rotor balanced about the single bearing, gimbal balancing problems are eliminated.

It is understood that minor variation from the form of the invention disclosed herein may be made without departure from the spirit and scope of the invention, and that the specification and drawings are to be considered as merely illustrative rather than limiting.

I claim:
1. A rate gyro, comprising:
a rotor;
a self-aligning bearing axially mounted within said rotor;
a frame on which said bearing is supported;
drive means internally connected to said rotor for rotation thereof;
said rotor having an axially extended portion;
a self-centering pick-off arm pivotally mounted on said frame;
a pin fixed in said pick-off arm;
said extended portion having an internal bearing ring engaging said pin and being rotatable thereon;
and means to detect motion of said pick-off arm about a neutral position.

2. A rate gyro, comprising:
a rotor having a central hub;
a self-aligning bearing in which said hub is journalled;
said rotor having an enlarged annular rim surrounding said bearing;
a frame on which said bearing is supported;
drive means flexibly connected to said rotor within said hub;
said hub having an axially extended portion;
a self-centering pick-off arm pivotally mounted on said frame;
a pin fixed in said pick-off arm;
said extended portion having an internal bearing ring engaging said pin and being rotatable thereon;
and means to detect motion of said pick-off arm about a neutral position.

References Cited by the Examiner
UNITED STATES PATENTS

| | | | |
|---|---|---|---|
| 1,495,769 | 5/24 | Brewerton | 74—5.7 X |
| 1,894,038 | 1/33 | Henderson | 74—5.7 X |
| 2,602,239 | 7/52 | Wrigley | 74—5.6 X |

BROUGHTON G. DURHAM, *Primary Examiner.*